United States Patent
Kalfs et al.

[19]

[11] Patent Number: 5,949,607
[45] Date of Patent: Sep. 7, 1999

[54] SYSTEM, APPARATUS AND METHOD FOR RECORDING AND REPRODUCING INFORMATION

[75] Inventors: Johannes J. W. Kalfs; Abraham Hoogendoorn, both of Eindhoven, Netherlands

[73] Assignee: U.S. Philips Corporation, New York, N.Y.

[21] Appl. No.: 08/744,800

[22] Filed: Nov. 6, 1996

[30] Foreign Application Priority Data

Nov. 10, 1995 [EP] European Pat. Off. .............. 95203068

[51] Int. Cl.⁶ .............................. G11B 5/55; G11B 5/584
[52] U.S. Cl. ....................................... 360/78.02; 360/77.12
[58] Field of Search .............................. 360/77.05, 77.12, 360/78.02, 77.13, 77.07, 63, 64, 75

[56] References Cited

U.S. PATENT DOCUMENTS

| | | | |
|---|---|---|---|
| 3,315,041 | 4/1967 | Sampson | 360/63 |
| 4,313,140 | 1/1982 | Keidl | 360/77.07 |
| 4,318,141 | 3/1982 | Haynes | 360/77.07 |
| 4,975,791 | 12/1990 | Eggebeen | 360/77.01 |
| 5,262,908 | 11/1993 | Iwamatsu et al. | 360/77.06 |
| 5,291,348 | 3/1994 | Copolillo | 360/77.12 X |

*Primary Examiner*—Aristotelis M. Psitos
*Assistant Examiner*—James L Habermehl
*Attorney, Agent, or Firm*—Welsh & Katz, Ltd.

[57] ABSTRACT

A system and method for recording and reproducing information includes a magnetic tape, a magnetic-head unit and an actuator. The magnetic tape has servo tracks containing servo signals. The servo signals have been written with a magnetic head, not shown, having a comparatively large gap length. As a result, the servo signals are recorded deep into the magnetic tape. The magnetic-head unit comprises a read head and a write head to inscribe the track, the read head following a bounding line between adjacent servo tracks and in response to the servo signals read from said servo tracks and by the read head. The system in accordance with the invention is characterized in that it comprises control means which determine the sequence in which the information tracks are written, the read head either following a track or between two respective non-overwritten parts of the magnetic tape, or following a track or between two respective overwritten parts of the magnetic tape.

14 Claims, 2 Drawing Sheets

SYSTEM, APPARATUS AND METHOD FOR RECORDING AND REPRODUCING INFORMATION

BACKGROUND OF THE INVENTION

1. Field of the Invention

The invention relates to a system for recording and/or reproducing information, comprising a magnetizable medium provided with a pattern of servo tracks containing servo signals in the form of a deep recorded magnetization pattern, and an apparatus comprising a magnetic-head unit comprising a read head, means for relatively moving the medium with respect to the magnetic-head unit in a direction along the servo tracks, an actuator for relatively moving the magnetic-head unit with respect to the medium in a direction transverse to the servo tracks, a servo circuit arranged between the read head and the actuator and adapted to make the read head follow a bounding line between two adjacent servo tracks in response to the servo signals read from said servo tracks by the read head, which apparatus is adapted to write information signals in information tracks over the servo signals in the servo tracks.

The invention also relates to an apparatus for use in such a system.

The invention further relates to a method of writing information signals in information tracks on a magnetizable medium provided with a pattern of servo tracks containing servo signals in the form of a deep recorded magnetization pattern, a read head following a bounding line between two adjacent servo tracks in response to the servo signals read from said servo tracks by the read head.

2. Discussion of the Related Arts

A magnetic recording system is known from U.S. Pat. No. 4,318,141, which uses buried servo or track-position-indication signals for the purpose of tracking. To record servo signals a magnetic head having a relatively large gap length is used, so as to enable the servo signals to be recorded to a large depth in the recording medium. For the storage of information signals a magnetic head having a relatively small gap length is used. Thus, the information signals are stored in a less deep part of the recording medium. The servo signals are stored in servo tracks, two adjacent servo tracks each storing a servo signal of a different frequency. A read head can be made to follow the bounding line between two adjacent servo tracks by positioning the read head by means of an actuator in such a manner that frequencies of the same amplitude are read. A disadvantage of the known system is that the read head does not always exactly follow the bounding line between two servo tracks in the case that a recording medium has been provided only partly with information signals.

SUMMARY OF THE INVENTION

It is an object of the invention to provide a system, an apparatus and a method for recording and/or reproducing information, wherein the read head follows the bounding line between two servo tracks with comparatively high accuracy.

The system in accordance with the invention is characterized in that the apparatus comprises control means for writing the information tracks in a sequence in which the read head either follows a track between two non-overwritten parts of the medium or follows a track between two overwritten parts of the medium.

The invention is based on the recognition of the fact that the read head not only reads signals from the track followed by the read head but also reads signals from parts of the medium which directly adjoin the track. This is particularly so in the case that the last-mentioned signals are low-frequency signals, as is customary for servo signals. In the case that an information signal has already been written to one side of the track to be followed and no information signal has been written yet to the other side of the track to be followed, the read head will not accurately follow the boundary area between two servo tracks. This is caused by the fact that when an information signal is written the underlying servo signal is attenuated in that it is overwritten with the information signal in the upper part of the magnetizable medium. Since the read head also reads parts of the medium which directly adjoin the track, which is referred to as the side reading effect, the amplitude of the servo signal of the partly overwritten servo track will be smaller than the amplitude of the non-overwritten servo track if the center of the read head is at the bounding line between the two servo tracks. The servo system will position the center of the read head off the bounding line between the two servo tracks so as to equalize the amplitudes of the two servo signals in the adjacent servo tracks. The measure in accordance with the invention ensures that in the parts adjacent the track to be followed the servo signal either is not overwritten, i.e. not attenuated, in both parts or is overwritten, i.e. attenuated, in both parts. As a result, the signal from both parts read with the side reading effect are read with equal amplitudes and the center of the read head is accurately positioned on the bounding line between the servo tracks.

An embodiment of the system in accordance with the invention is characterized in that the magnetic head unit comprises a write head coupled to the read head to inscribe the track followed by the read head. By having the read head and the write head follow the same track the dimension of the magnetizable medium in a direction transverse to the tracks can be utilized completely for the storage of information. This measure further enables such a magnetic-head unit to be used for writing on media having mutually different distances between the bounding lines formed between the servo tracks.

An embodiment of the system in accordance with the invention is characterized in that the magnetic-head unit comprises a plurality of write heads, the center distance between adjacent write heads is equal to four times the center distance between adjacent information tracks, and the control means are adapted to write four adjacent and consecutively numbered information tracks by means of one write head in the sequence first track, third track, second track and fourth track. In order to simplify the manufacture of the magnetic-head unit it is preferable to arrange the write heads at some distance from one another. However, a large mutual distance also has disadvantages. As a matter of fact, it has been found that a magnetizable medium having a plastics base, such as for example a magnetic tape, contracts and expands in a direction transverse to the tracks as a result of humidity and temperature influences. As a consequence, the center distance between the information tracks on such a medium will also vary. If the magnetic-head unit comprises a plurality of magnetic heads the distance between these write heads will vary to a substantially smaller extent. This may lead to a mismatch between the center distance of the information tracks and the center distance of the write heads. It has been found that the above measures keep such a mismatch within acceptable limits even when eight write heads are used.

An embodiment of the system in accordance with the invention is characterized in that the magnetic-head unit comprises eight write heads. It has been found that this measure forms a satisfactory compromise between the complexity of the apparatus and the speed with which information can be written on the magnetizable medium.

The apparatus in accordance with the invention comprises a magnetic-head unit comprising a read head, means for relatively moving the medium with respect to the magnetic-head unit in a direction along the servo tracks, an actuator for moving the magnetic-head unit in a direction transverse to the servo tracks, a servo circuit arranged between the read head and the actuator and adapted to make the read head follow a bounding line between two adjacent servo tracks in response to the servo signals read from said servo tracks by the read head, and control means for writing information tracks over the servo tracks in a sequence in which the read head either follows a track between two non-overwritten parts of the medium or follows a track between two overwritten parts of the medium.

The method in accordance with the invention is characterized in that the information tracks are written in a sequence in which the read head either follows a track between two non-overwritten parts of the medium or follows a track between two overwritten parts of the medium.

BRIEF DESCRIPTION OF THE DRAWINGS

The invention will now be described in more detail, by way of example, with reference to the drawings, in which.

DETAILED DESCRIPTION OF THE PREFERRED EMBODIMENT OF THE INVENTION

Figure 1:
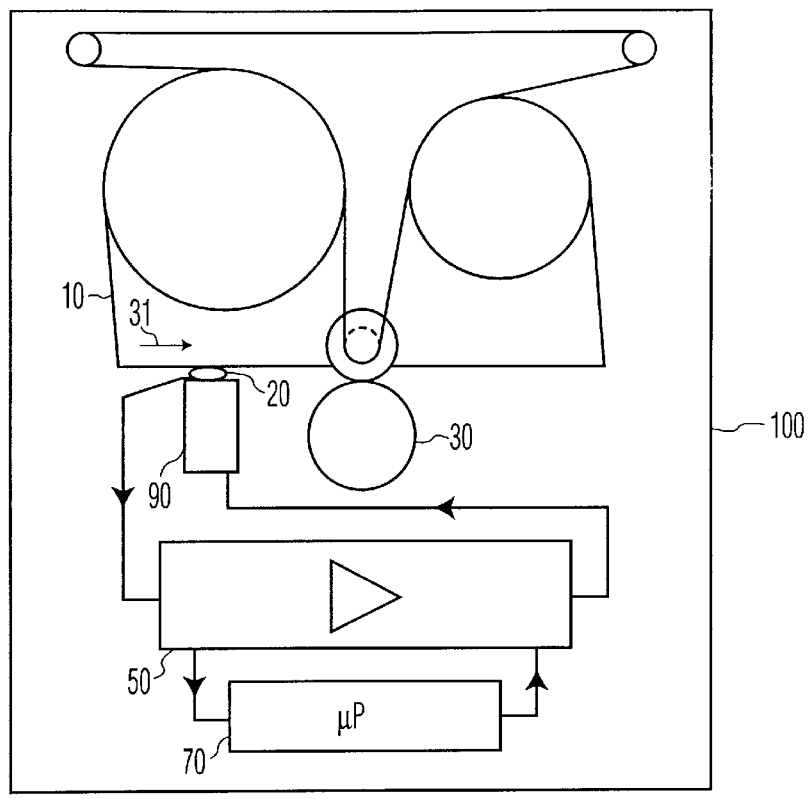
FIG. 1 shows diagrammatically the system in accordance with the invention.

FIG. 1 shows diagrammatically the system in accordance with the invention. The system comprises an apparatus 100 and a magnetizable medium, in the present case a magnetic tape 10. The magnetic tape 10 has been provided with a pattern of servo tracks 11–19 containing servo signals in the form of a deep recorded magnetization pattern (see FIG. 2). The apparatus 100 comprises a magnetic-head unit 20 and means, in the present case a motor 30, for relatively moving the magnetic tape 10 with respect to the magnetic-head unit 20 in a direction 31 along the servo tracks (see FIG. 2). The apparatus 100 further comprises an actuator 40 for moving the magnetic-head unit 20 transversely to the servo tracks and a servo circuit 50 arranged between the magnetic-head unit 20 and the actuator 40. The apparatus 100 comprises control means, in the present case a microcomputer 70, for controlling the actuator 40 and the magnetic-head unit 20.

Figure 2:
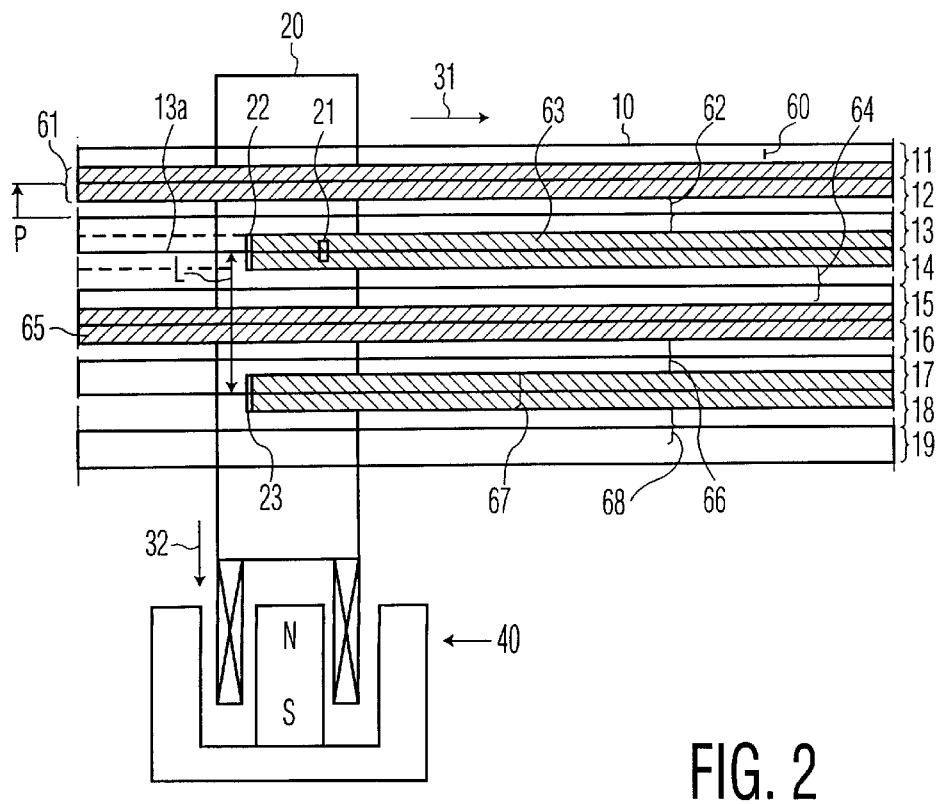
FIG. 2 illustrates the recording of information signals on a magnetizable medium in an embodiment of the system in accordance with the invention.

FIG. 2 shows diagrammatically a magnetizable medium in the form of the magnetic tape 10, the magnetic-head unit 20 and the actuator 40. The magnetic tape 10 has been provided with a pattern of servo tracks 11–19 containing servo signals. The servo signals have been recorded with a magnetic head, not shown, having a comparatively large gap length. As a result, the servo signals are stored deep into the magnetic tape 10. The servo tracks having odd reference numerals contain a servo signal of a first frequency, and the servo tracks having even reference numerals contain a servo signal of a second frequency. The magnetic-head unit 20 comprises a read head 21 and a write head 22 coupled to the read head 21 in order to inscribe the track 63 followed by the read head. The apparatus 100 as shown in FIG. 1 is constructed to write information signals in information tracks 61–68. To position the information tracks 61–68 the apparatus 100 comprises a servo circuit 50 (see FIG. 1). The servo circuit 50 is arranged between the read head 21 and the actuator 40 and is adapted to make the read head 21 follow a bounding line 13a between two adjacent servo tracks, in the present case 13 and 14, in response to the servo signals read from the servo tracks 13 and 14 by the read head 21. In accordance with the method described comprehensively in U.S. Pat. No. 4,318,141 the servo circuit 50 then controls the actuator 40 in such a manner that the read head 21 reproduces the first and the second frequency with the same amplitude. This is normally so if the center of the read head 21 follows a bounding line 13a between two adjacent servo tracks 13 and 14. The system in accordance with the invention is characterized in that the apparatus 100 comprises control means 70 (see FIG. 1) which determines the sequence in which the information tracks 61–68 are read by the read head 21 following a track 61 or 63 between two respective non-overwritten parts 60 and 62 or 62 and 64 of the magnetic tape 10, or a track 62 or 64 between two respective overwritten parts 61 and 63 or 63 and 65 of the magnetic tape 10.

The magnetic-head unit 20 in FIG. 2 comprise a plurality of write heads, in the present case a write head 22 and a write head 23. The center distance L between the adjacent write heads 22 and 23 is equal to four times the center distance P between two adjacent information tracks. In the embodiment of the system in accordance with the invention as shown in FIG. 2 the control means 70 (see FIG. 1) are adapted to write four adjacent and consecutively numbered information tracks 61, 62, 63 and 64 by means of the write head 22. In addition, the control means 70 is adapted to write another four adjacent and consecutively numbered information tracks 65, 66, 67 and 68 by means of the write head 23. The control means 70 are further adapted to record said information tracks in the sequence 61 simultaneously with 65, 63 simultaneously with 67, 62 simultaneously with 66, and 64 simultaneously with 68.

Figure 3:
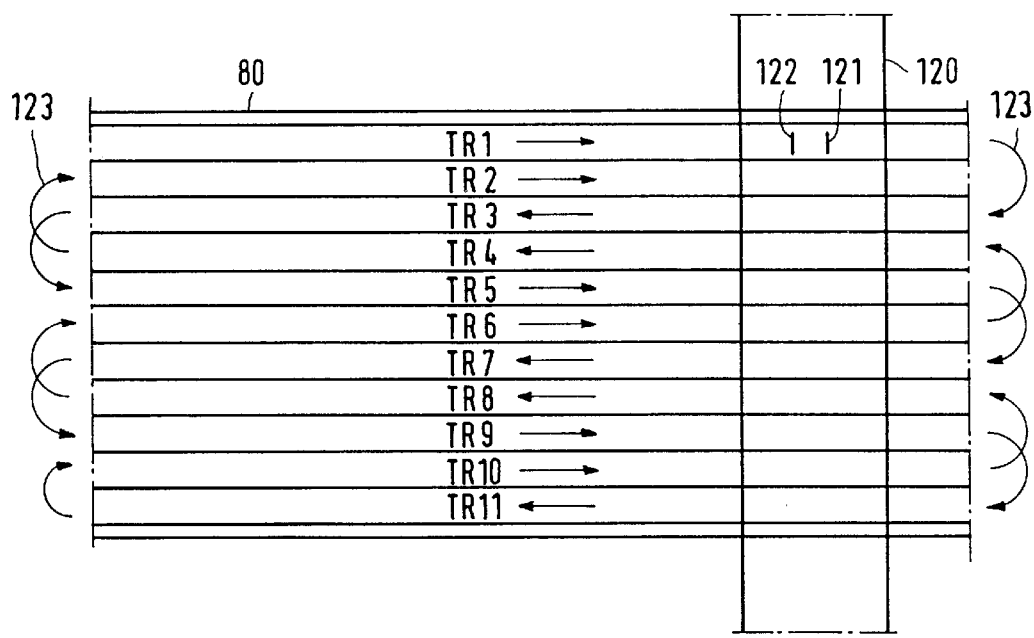
FIG. 3 shows the sequence in which information signals are written on a magnetizable medium in another embodiment of the system in accordance with the invention.

FIG. 3 shows a magnetizable medium, in the present case a magnetic tape 80, and a magnetic-head unit 120 comprising a read head 121 and a write head 122 in a further embodiment of the system in accordance with the invention. The magnetic tape 80 has information tracks TR1 to TR11. The information tracks TR1 to TR11 have been written over servo tracks, not shown, in a manner as described with reference to FIG. 1 and FIG. 2. In this further embodiment of the system in accordance with the invention the information tracks TR1 to TR11 have also been written in a sequence in which the read head 121 either follows a track between two non-overwritten parts of the magnetic tape 80 or a track between two overwritten parts of the magnetic tape 80. This is achieved in that under control of control means, not shown, the read head 121 follows a path indicated by arrows 123 when recording information signals by means of the write head 122. This path is such that the information tracks TR1 to TR11 are written in the sequence: TR1, TR3, TR5, TR7, TR9, TR11, TR10, TR8, TR6, TR4 and TR2.

Figure 4:
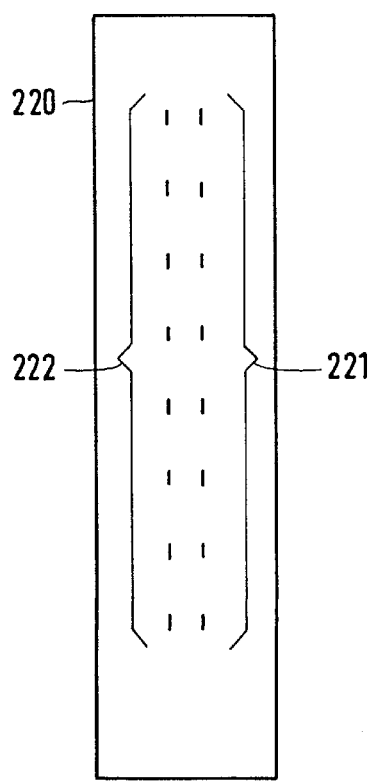
FIG. 4 shows a magnetic-head unit for a further embodiment of the system in accordance with the invention.

FIG. 4 shows a magnetic-head unit 220 in another embodiment of the system in accordance with the invention. The magnetic-head unit 220 comprises eight write heads 222. This enables eight information tracks to be recorded simultaneously. The magnetic-head unit 220 further comprises eight read heads 221. The read heads 221 are arranged in such a manner that they each follow the same track together with one of the write heads 222.

It is to be noted that the invention is not limited to the embodiments shown. Various other embodiments are possible within the scope of the invention. For example, instead of a magnetic tape a magnetic disc may be used. Moreover, the microcomputer 70 may be replaced by an analog circuit.

It is to be noted that the invention is particularly suitable to cope with the side reading effect in thin-film magnetic heads having a magnetoresistive transducing element. This is caused by the fact that such a magnetoresistive transducing element is very susceptible to the side reading effect described above, particularly if the servo signals have been stored on the medium as long-wave magnetization patterns.

We claim:

1. A system for recording and reproducing information, comprising a magnetizable medium provided with a pattern tracks containing servo signals in the form of a deep recorded magnetization pattern, and an apparatus comprising a magnetic-head unit comprising a read head, means for relatively moving the medium with respect to the magnetic-head unit in a direction along the servo tracks, an actuator for relatively moving the magnetic-head unit with respect to the medium in a direction transverse to the servo tracks, a servo circuit arranged between the read head and the actuator and adapted to make the read head follow a bounding line between two adjacent servo tracks in response to the servo signals read from said servo tracks by the read head, which apparatus is adapted to write information signals in information tracks over the servo signals in the servo tracks, the apparatus comprises control means for writing the information tracks in a sequence in which the read head either follows a track between two non-overwritten servo tracks or follows a track between two overwritten servo tracks.

2. A system as claimed in claim 1, characterized in that the magnetic head unit comprises a write head coupled to the read head to inscribe the track followed by the read head.

3. A system as claimed in claim 2, wherein:

the magnetic-head unit comprises a plurality of write heads;

the center distance between adjacent write heads is equal to four times the center distance between adjacent information tracks; and the control means are adapted to write four adjacent and consecutively numbered information tracks by means of one write head in the sequence first track, third track, second track and fourth track.

4. A system as claimed in claim 1, characterized in that the magnetic-head unit comprises a plurality of write heads, the center distance between adjacent write heads is equal to four times the center distance between adjacent information tracks, and the control means are adapted to write four adjacent and consecutively numbered information tracks by means of one write head in the sequence first track, third track, second track and fourth track.

5. A system as claimed in claim 4, characterized in that the magnetic-head unit comprises eight write heads.

6. A system as claimed in claim 4, characterized in that the magnetic-head unit comprises eight write heads.

7. An apparatus for recording and/or reproducing information on a magnetizable medium, said medium having a pattern of servo tracks containing servo signals in the form of a deeply recorded magnetization pattern, said apparatus comprising a magnetic-head unit comprising a read head, means for relatively moving the medium with respect to the magnetic-head unit in a direction along the servo tracks, an actuator for relatively moving the magnetic-head unit with respect to the medium in a direction transverse to the servo tracks, a servo circuit arranged between the read head and the actuator and adapted to make the read head follow a bounding line between two adjacent servo tracks in response to the servo signals read from said servo tracks by the read head, which apparatus is adapted to write information signals in information tracks over the servo signals in the servo tracks, the apparatus comprises control means for writing the information tracks in a sequence in which the read head either follows a track between two non-overwritten servo tracks or follows a track between two overwritten servo tracks.

8. An apparatus as claimed in claim 7, characterized in that the magnetic head unit comprises a write head coupled to the read head to inscribe the track followed by the read head.

9. An apparatus as claimed in claim 8 characterized in that the magnetic-head unit comprises a plurality of write heads, the center distance between adjacent write heads is equal to four times the center distance between adjacent information tracks, and the control means are adapted to write four adjacent and consecutively numbered information tracks by means of one write head in the sequence first track, third track, second track and fourth track.

10. An apparatus as claimed in claim 9, characterized in that the magnetic-head unit comprises eight write heads.

11. An apparatus as claimed in claim 7, characterized in that the magnetic-head unit comprises a plurality of write heads, the center distance between adjacent write heads is equal to four times the center distance between adjacent information tracks, and the control means are adapted to write four adjacent and consecutively numbered information tracks by means of one write head in the sequence first track, third track, second track and fourth track.

12. An apparatus as claimed in claim 11, characterized in that the magnetic-head unit comprises eight write heads.

13. A method of writing information signals in information tracks on a magnetizable medium provided with a pattern of servo tracks containing servo signals in the form of a deep recorded magnetization pattern, a read head following a bounding line between two adjacent servo tracks in response to the servo signals read from said servo tracks by the read head, the information tracks are written in a sequence in which the read head either follows a track between two non-overwritten servo tracks or follows a track between two overwritten servo tracks.

14. An apparatus for recording and reproducing information on tracks of a recording medium having servo tracks comprising:

a writing head for recording said information on said recording medium; and said writing head recording said information such that either there is none of said information present on adjacent tracks of said recording medium or said information is present on all adjacent tracks of said recording medium.

\* \* \* \* \*